US012403660B2

(12) United States Patent
Roberts

(10) Patent No.: US 12,403,660 B2
(45) Date of Patent: Sep. 2, 2025

(54) SYSTEM AND METHOD FOR NO-KILL PRODUCTION OF THREE-DIMENSIONAL VISUAL REPLICA OF AQUATIC SPECIES, AND REPLICA PRODUCED BY SAME

(71) Applicant: Caza Holdco, LLC, Stonewall, TX (US)

(72) Inventor: Thomas Cody Roberts, Austin, TX (US)

(73) Assignee: Caza Holdco, LLC, Stonewall, TX (US)

( * ) Notice: Subject to any disclaimer, the term of this patent is extended or adjusted under 35 U.S.C. 154(b) by 257 days.

(21) Appl. No.: 18/217,458

(22) Filed: Jun. 30, 2023

(65) Prior Publication Data

US 2024/0001618 A1   Jan. 4, 2024

Related U.S. Application Data

(60) Provisional application No. 63/358,030, filed on Jul. 1, 2022.

(51) Int. Cl.
*B29C 64/386* (2017.01)
*B33Y 10/00* (2015.01)
(Continued)

(52) U.S. Cl.
CPC ............ *B29C 64/386* (2017.08); *B33Y 10/00* (2014.12); *B33Y 50/00* (2014.12);
(Continued)

(58) Field of Classification Search
CPC .................................................. G05B 19/4207
See application file for complete search history.

(56) References Cited

U.S. PATENT DOCUMENTS 4,753,031 A * 6/1988 Owen ..................... A01K 97/00
  206/315.11
5,089,972 A * 2/1992 Nachman ................ B66C 13/48
  700/218
(Continued)

FOREIGN PATENT DOCUMENTS

CN    101865414 B  * 10/2012
JP    2005110820 A *  4/2005
(Continued)

OTHER PUBLICATIONS

Manzano et al, Using Digital 3D Scanning to Create "Artifictions" of the Passenger Pigeon and Harelip Sucker, Two Extinct Species in Eastern North America: The Future Examines the Past, Ethnobiology Letters, Data, Methods and Taxonomies, Special Issue on Digital Zooarchaeology, vol. 6(2), 232-241 (Year: 2015).*
(Continued)

*Primary Examiner* — Timothy Kennedy
(74) *Attorney, Agent, or Firm* — The Kumar Law Firm PLLC; Sanjeev Kumar

(57) ABSTRACT

A no-kill computer-implemented method for collection of physical information and production of a three-dimensional visual replica of a fish includes: first providing a computer-implemented wireless mobile device having a processor; second providing a computer-implemented collection and production platform application to receive and record collected visual image data of the field of view; training a collector lens on a physical visual reference in the field of view; collecting visual image data of the field of view; identifying specimen visual image data within overall visual image data for the complete field of view; compensating for uncontrolled floating motion; of the vessel; generating a virtual three-dimensional visual model of the fish; and fabricating, by a three-dimensional printer, a physical three-
(Continued)

dimensional visual replica from the virtual three-dimensional visual model of the fish.

4 Claims, 3 Drawing Sheets

(51) Int. Cl.
| | |
|---|---|
| *B33Y 50/00* | (2015.01) |
| *G05B 19/42* | (2006.01) |
| *G06T 17/00* | (2006.01) |
| *G06V 10/10* | (2022.01) |
| *G06V 10/764* | (2022.01) |

(52) U.S. Cl.
CPC .......... *G05B 19/4207* (2013.01); *G06T 17/00* (2013.01); *G06V 10/17* (2022.01); *G06V 10/764* (2022.01); *G06T 2200/08* (2013.01)

(56) References Cited

U.S. PATENT DOCUMENTS

| | | | | |
|---|---|---|---|---|
| 5,602,891 | A * | 2/1997 | Pearlman | A61B 6/466 |
| | | | | 250/363.01 |
| 11,662,710 | B2 * | 5/2023 | Cammack | H04N 13/20 |
| | | | | 700/98 |
| 11,986,983 | B2 * | 5/2024 | Bevelhimer | B33Y 80/00 |
| 2013/0236109 | A1 * | 9/2013 | Madden | B42D 25/309 |
| | | | | 382/218 |
| 2014/0300722 | A1 * | 10/2014 | Garcia | G01B 11/02 |
| | | | | 348/135 |
| 2016/0297149 | A1 * | 10/2016 | Albert | B33Y 50/02 |
| 2021/0204553 | A1 * | 7/2021 | Mehta | G06V 10/82 |
| 2022/0040894 | A1 * | 2/2022 | Bevelhimer | B29C 33/3842 |
| 2022/0066417 | A1 * | 3/2022 | Cammack | G06T 7/55 |

FOREIGN PATENT DOCUMENTS

| | | | |
|---|---|---|---|
| JP | 2015049806 A * | 3/2015 | |
| RU | 2664966 C1 * | 8/2018 | |
| WO | WO-9824065 A1 * | 6/1998 | ......... G01S 15/8993 |
| WO | WO-2021038753 A1 * | 3/2021 | |

OTHER PUBLICATIONS

Artec 3D, 3D Scanning A Fish, Mar. 10, 2015, https://www.youtube.com/watch?v=GD-cmo0aLS0 (Year: 2015).*

Andrew Sink, 3D Scan From Photos! Make a 3D Model With Free Software!, Sep. 19, 2017, https://www.youtube.com/watch?v=uYOL6qg1NuN (Year: 2017).*

Mouy et al, FishCam: A low-cost open source autonomous camera for aquatic research, HardwareX, vol. 8, pp. 1-33 (Year: 2020).*

Machine translation of JP-2005110820-A, retrieved from USPTO database Apr. 24, 2025 (Year: 2025).*

Machine translation of CN-101865414-B, retrieved from USPTO database Apr. 24, 2025 (Year: 2025).*

Machine translation of JP-2015049806-A, retrieved from USPTO database Apr. 24, 2025 (Year: 2025).*

Machine translation of RU-2664966-C1, retrieved from USPTO database Apr. 24, 2025 (Year: 2025).*

Machine translation of WO-2021038753-A1, retrieved from USPTO database Apr. 24, 2025 (Year: 2025).*

* cited by examiner

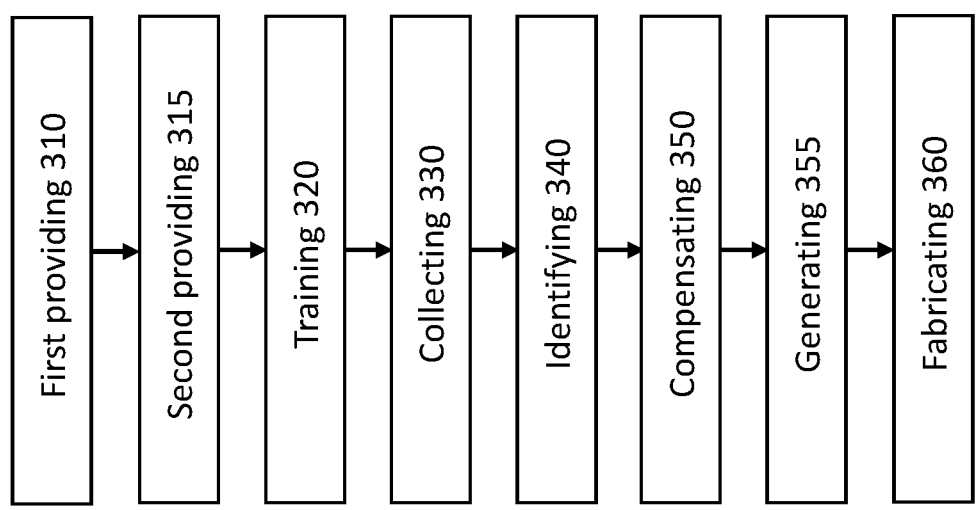

SYSTEM AND METHOD FOR NO-KILL PRODUCTION OF THREE-DIMENSIONAL VISUAL REPLICA OF AQUATIC SPECIES, AND REPLICA PRODUCED BY SAME

CROSS-REFERENCE TO RELATED APPLICATIONS

This application at the date of filing claims the benefit of U.S. Provisional Patent Application No. 63/358,030, filed Jul. 1, 2022 and having the title: "SYSTEM AND METHOD FOR NO-KILL PRODUCTION OF THREE-DIMENSIONAL VISUAL REPLICA OF AQUATIC SPECIES, AND REPLICA PRODUCED BY SAME."

FIELD OF THE INVENTION

The disclosure relates to computer-implemented platforms for no-kill collection of physical information about a captured specimen of an aquatic species, such as fish, and production of a three-dimensional visual replica of the specimen. Particularly, the disclosure relates to a computer-implemented platform including a mobile wireless device, such as a smartphone or tablet computer having a camera system, for no-kill collection of physical information about a fish while on board a vessel, such as a recreational fishing boat, and production of a three-dimensional visual replica, such as a trophy replica, of the fish.

BACKGROUND OF THE INVENTION

The disclosure relates to computer-implemented platforms for no-kill collection of physical information about a captured specimen of an aquatic species, such as fish, and production of a three-dimensional visual replica of the specimen. As used herein, "captured" includes the harvesting of aquatic species, such as fish, by angling, fishing, netting, catching, or similar modes of obtaining fish from a substantial body of water, such as by fishing from a vessel or boat. The disclosure also relates to a computer-implemented platform including a mobile wireless device, such as a smartphone or tablet computer having a built-in camera system, for no-kill collection of physical information about a fish while on board a vessel, such as a recreational fishing boat, and production of a three-dimensional visual replica, such as a trophy replica, of the fish.

There is need for a convenient and user-friendly, mobile, no-kill computer-implemented system for collection of physical information of fish, such as fish caught when sportfishing, that enables an unskilled user to utilize the system without specialized skills. There is need for such no-kill, unskilled systems for producing virtual three-dimensional models of fish. There is further need for no-kill, unskilled systems for producing physical three-dimensional visual replicas of fish. There is need for a convenient and user-friendly, mobile, no-kill method for collection of physical information of fish, such as fish caught when sportfishing, that enables an unskilled user to utilize the system without specialized skills. Unless expressly stated to the contrary, the form of instantiation of any element of this disclosure shall be considered as being only a matter of design choice.

BRIEF SUMMARY OF THE INVENTION

A mobile, no-kill computer-implemented system may be configured to perform collection of physical visual information of fish, such as fish caught when sportfishing, by operations of a downloadable software application installed on a wireless mobile device having a processor, such as a smartphone or tablet computer. Such no-kill system may provide a platform configured to enable an unskilled user to utilize the system without specialized skills. Such no-kill system may be configured for producing virtual three-dimensional models of fish. A no-kill, unskilled system may be configured for producing physical three-dimensional visual replicas of fish, such as by operations of an additive, three-dimensional printer.

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 3 is a simplified flow diagram of a computer-implemented method for no-kill collection of physical information and production of a three-dimensional visual replica of a captured specimen of an aquatic species, in an embodiment.

DETAILED DESCRIPTION OF ILLUSTRATIVE EMBODIMENTS

Figure 1:
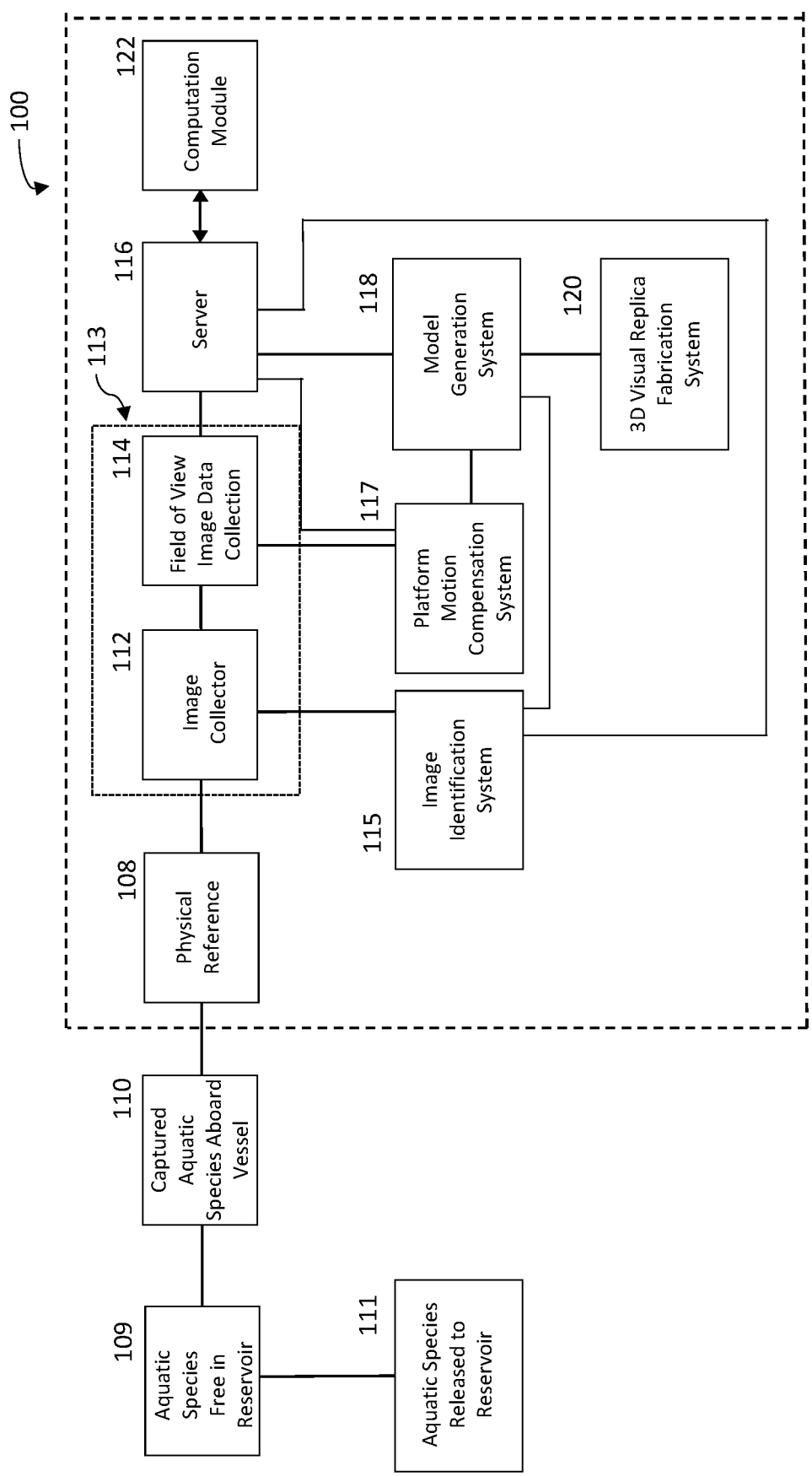
FIG. 1 is a simplified schematic diagram of a computer-implemented system for no-kill collection of physical information and production of a three-dimensional visual replica of a captured specimen of an aquatic species, in an embodiment.

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures, and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Illustrated in FIG. 1 is a simplified schematic diagram of a computer-implemented system 100 for no-kill collection of physical information and production of a three-dimensional visual replica of a captured specimen of an aquatic species, such as a fish. Such fish may be caught in any manner such as, for example, by sportfishing by an angler on a vessel, such as a recreational fishing boat, on a body of water such as the ocean, lake, river, or reservoir. As shown in FIG. 1, a system 100 for no-kill production of three-dimensional visual replica of a specimen of an aquatic species, such as a fish, may include a computer-implemented wireless mobile device 113, such as a smartphone or tablet computer, having a processor and network interface for communication over a packetized data communication network, which may be the Internet or any suitable communications network infrastructure. In an embodiment, the wireless mobile device 113 may include a built-in camera having a lens 112 trained on a field of view to collect visual image data of the field of view. The built-in camera may be configured for operation in relation to the processor to collect visual image data of the field of view of the camera lens and provide the collected visual image data from the lens to a collection and production platform application 114.

In an embodiment, system 100 may include a computer-implemented collection and production platform application 114 configured for operation in relation to the processor of the wireless mobile device 113. In an embodiment, the production platform application 114 may be a downloadable software application. The collection and production platform application 114 system may receive visual image data for the field of view of the collecting lens 112 of the built-in camera system, where the visual image data is passed to the collection and production platform application 114 from the collecting lens 112 of the built-in camera system. The collection and production platform application 114 thus receives collected visual image data of the field of view.

In an embodiment, system 100 may include a physical visual reference 108 in the field of view of the collector lens 112 of the built-in camera of the wireless mobile device. In an embodiment, the physical visual reference may include a plurality of visual reference points which are identifiable, predetermined, or both. In an embodiment, for example, the physical reference may be a ruled measuring plate including both a length ruler and height ruler for measuring length and height of the captured, live fish when placed on the measuring plate. The physical visual reference, in an embodiment, may further a thickness ruler for measuring thickness between opposed sides of the live fish. In an embodiment, for example, the physical visual reference may include a set or plurality of reference points identified by high visibility markings, such as high visibility paint spots at fixed reference point positions. The high visibility reference points may be fixed or known positions on the ruled measuring plate, on the vessel in the field of view, a set of preselected geometric reference points in the field of view, or combination of the preceding.

In an embodiment, system 100 may further include the computer-implemented collection and production platform application 114 configured for receiving and recording the collected visual image data of the field of view received from the collector lens 112 of the built-in camera of the wireless mobile device. The collected visual image data may include, without limitation, a fixed visual image such as a single photograph, plurality of fixed visual images or photographs, or video comprising a plurality of visual images in a time-ordered series, of the field of view of the built-in camera of the image collection system of the wireless mobile device. Such collecting and recording may by performed by operations of the collection and production platform application 114 upon receiving collected visual image data from the collector lens 112 of the built-in camera under control of the processor controlling both the built-in camera and the collection and production platform application 114. The collecting and recording of visual image data of the field of view may be initiated or actuated in response to the built-in camera or image collection system receiving an image collection instruction. Such image collection instruction may be initiated or actuated automatically, by a timer, in response to manual operation of an image collection command input or button, or in response to voice activation of an image collection voice command input. The physical visual reference will be located in the field of view of the built-in camera. At collecting, the fish will also be located in the field of view of the built-in camera. In an embodiment, the fish and physical image reference will be located in the field of view in a selected, or predetermined, physical or geometric relationship. For example, the fish may be located on the ruled measurement plate including the plurality of reference points identified by high visibility markings, and these will be located in the field of view at collecting. Operations of the collection and production platform application 114 may cause, control, or both recording and storing of collected visual image data in suitable data storage media or memory which is accessible for retrieving the visual image data. The data storage media or memory may be located in the wireless mobile device, a server, or may be an accessible cloud storage resource.

In an embodiment, system 100 may include image identification system 115 configured to identify specimen visual image data within the larger, overall visual image data for the complete field of view and received in relation to collecting field of view visual image data. Image identification system 115 may be configured to identify and use the plurality of high visibility points of the physical visual reference in the field of view as a basis for differentiating and identifying visual image data of the fish in the field of view.

In an embodiment, system 100 may include platform motion compensation system 117 configured for compensating for motion of the vessel (i.e., the boat) due to floating motion on the surface of the water in a body of water being fished. Such body of water may be the ocean, a river, lake or other reservoir in which an angler is fishing from a boat. Motion compensation may be performed due to uncontrolled movement of: the vessel, physical visual reference 108 points, the fish being imaged, and/or the field of view of the collector lens 112 of the built-in camera of the wireless mobile device 113 being used for collecting the visual image data of the field of view.

In an embodiment, system 100 may include a model generation system 118 configured for generating a virtual three-dimensional visual model of the fish, from the specimen visual image data provided from the collecting and recording platform application 114 and image identification system 115. The generated virtual three-dimensional visual model of the fish thus may embody the identified specimen visual image data provided from identifying the specimen visual image data of the fish. The model generation system 118 may include a dimensional conversion algorithm, which may be performed in relation to the specimen visual image data of the fish, which may be two-dimensional length and width data, to provide the virtual three-dimensional visual model of the fish including length, width and thickness data. In addition to the two-dimensional physical data or three-dimensional physical data of the length, width and thickness data or measurements of the fish, the visual image data may further include visual coloration, shade, and brightness data at a desired resolution.

In an embodiment, system 100 may include three-dimensional replica fabrication system 120 configured to fabricate a physical three-dimensional visual replica from the virtual three-dimensional visual model of the fish. The three-dimensional replica fabrication system 120 may receive the virtual three-dimensional visual model data provided from the model generation system 118. Such fabrication system may include, for example, an additive, three-dimensional printer.

Figure 2:
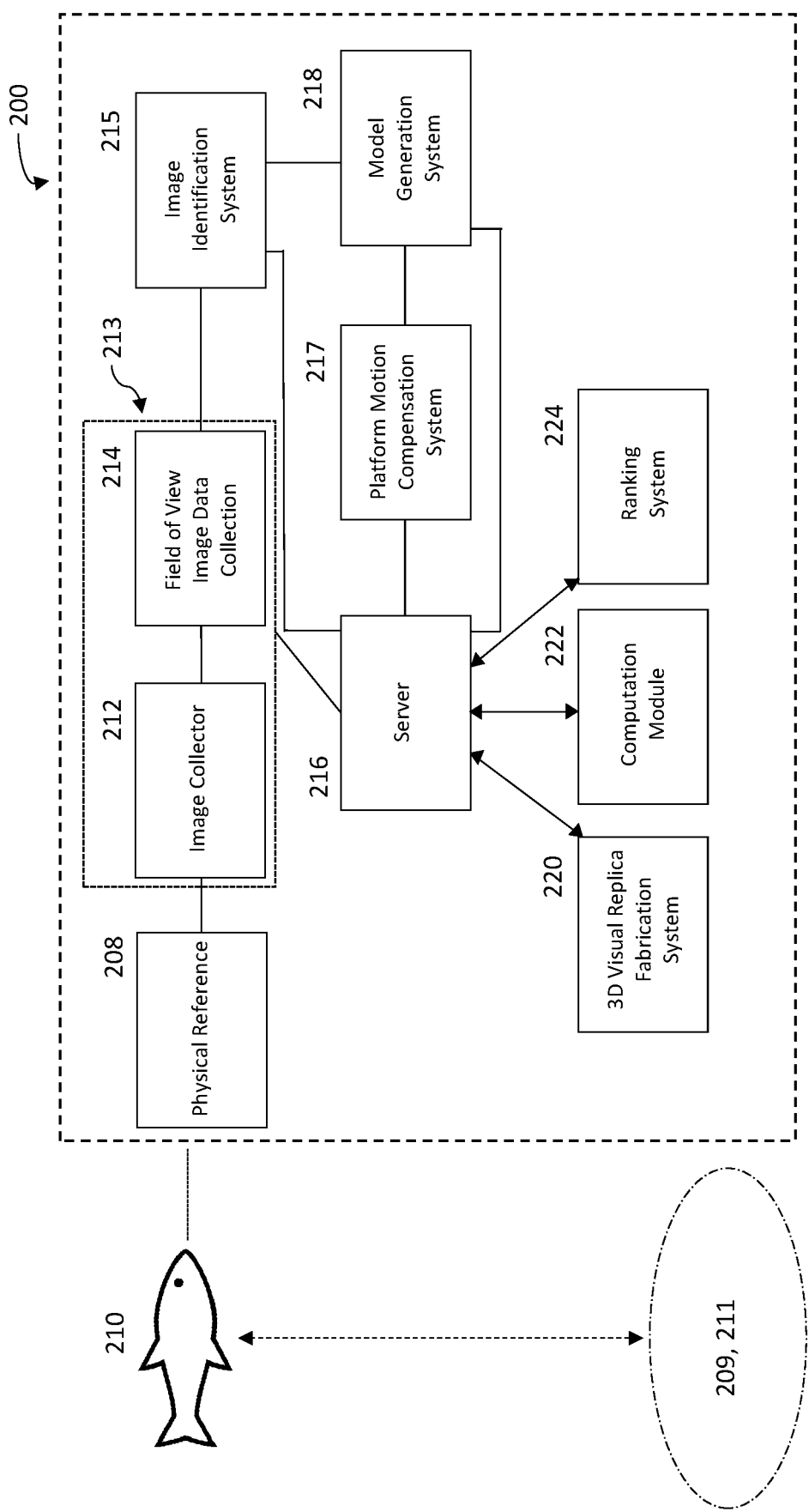
FIG. 2 is a simplified schematic diagram of a computer-implemented system for no-kill collection of physical information and production of a three-dimensional visual replica of a captured specimen of an aquatic species, in an embodiment.

Illustrated in FIG. 2 is simplified schematic diagram of a computer-implemented system 200 for no-kill collection of physical information and production of a three-dimensional visual replica of a captured specimen of an aquatic species, in an embodiment. System 200 may be substantially identical to system 100 in structure and function, except as otherwise dictated by context.

FIG. 3 is a simplified flow diagram of a computer-implemented method 300 for no-kill collection of physical information and production of a three-dimensional visual replica of a captured specimen of an aquatic species, in an embodiment.

As shown in FIG. 3, method 300 may include first providing 310 a computer-implemented wireless mobile device having a processor, such as a smartphone or tablet computer, and network interface for communication over a packetized data communication network, which may be the Internet or any suitable communications network infrastructure. In an embodiment, the wireless mobile device may include an image collection and recording platform application configured for operation in relation to the processor. The wireless mobile device may include a built-in camera system having a collector lens 112 trained on a field of view.

In an embodiment, method 300 may include second providing 315 a computer-implemented collection and production platform application, such as a downloadable software application, configured for operation in relation to the processor of the wireless mobile device of the first providing 310.

Method 300 may include training 320 the collector lens on a physical visual reference in the field of view of the built-in camera of the image collection system of the wireless mobile device. In an embodiment, the physical visual reference may include a plurality of visual reference points which are identifiable, predetermined, or both. In an embodiment, for example, the physical reference may be a ruled measuring plate including both a length ruler and height ruler for measuring length and height of the captured, live fish when placed on the measuring plate. The physical visual reference, in an embodiment, may further a thickness ruler for measuring thickness between opposed sides of the live fish. In an embodiment, for example, the physical visual reference may include a set or plurality of reference points identified by high visibility markings, such as high visibility paint spots at fixed reference point positions. The high visibility reference points may be fixed or known positions on the ruled measuring plate, on the vessel in the field of view, a set of preselected geometric reference points in the field of view, or combination of the preceding.

In an embodiment, method 300 may include collecting 330 visual image data of the field of view of the built-in camera of the image collection system of the wireless mobile device. The collected visual image data may include, without limitation, a fixed visual image such as a single photograph, plurality of fixed visual images or photographs, or video comprising a plurality of visual images in a time-ordered series, of the field of view of the built-in camera of the image collection system of the wireless mobile device. Such collecting 330 may by performed by operations of the built-in camera of the image collection system in relation to the processor controlling the image collection system. The collecting 330 may be initiated or actuated in response to the built-in camera or image collection system receiving an image collection instruction. Such image collection instruction may be initiated or actuated automatically, by a timer, in response to manual operation of an image collection command input or button, or in response to voice activation of an image collection voice command input. At the collecting 330, the physical visual reference will be located in the field of view of the built-in camera. At the collecting 330, the fish will also be located in the field of view of the built-in camera. In an embodiment, the fish and physical image reference will be located in the field of view in a selected, or predetermined, physical or geometric relationship. For example, the fish may be located on the ruled measurement plate including the plurality of reference points identified by high visibility markings, and these will be located in the field of view at the collecting 330. Collected visual image data may be recorded and stored in suitable data storage media or memory which is accessible for retrieving the visual image data. The data storage media or memory may be located in the wireless mobile device, a server, or may be an accessible cloud storage resource.

In an embodiment, method 300 may include identifying 340 specimen visual image data within the larger, overall visual image data for the complete field of view, generated in the collecting 330. Identifying 340 may include identifying and using the plurality of high visibility points of the physical visual reference in the field of view as a basis for identifying visual image data of the fish in the field of view.

In an embodiment, method 300 may include compensating 350 for motion of the vessel (i.e., the boat) due to floating motion on the surface of the water in a body of water being fished. Such body of water may be the ocean, a river, lake or other reservoir in which an angler is fishing from a boat. Motion compensation may be performed due to uncontrolled movement of: the vessel, physical visual reference points, the fish being imaged, and/or the field of view of the built-in camera of the wireless mobile device being used for collecting 330 the visual image data of the field of view.

In an embodiment, method 300 may include generating 355 a virtual three-dimensional visual model of the fish, from the specimen visual image data provided from the identifying 340. The generated virtual three-dimensional visual model of the fish thus may embody the identified specimen visual image data provided from identifying 340 the specimen visual image data of the fish. A dimensional conversion algorithm may be performed in relation to the specimen visual image data of the fish, which may be two-dimensional length and width data, to provide the virtual three-dimensional visual model of the fish including length, width and thickness data. In addition to the two-dimensional physical data or three-dimensional physical data of the length, width and thickness data or measurements of the fish, the visual image data may further include visual coloration, shade, and brightness data at a desired resolution.

In an embodiment, method 300 may include fabricating 360 a physical three-dimensional visual replica from the virtual three-dimensional visual model of the fish, by providing virtual three-dimensional visual model data to a fabrication system. Such fabrication system may include, for example, an additive, three-dimensional printer.

Apparatus, methods, and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods, and apparatus described herein, one of ordinary skill in the art will appreciate that implementations can be made for other fields of art, systems, apparatus, or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. A no-kill computer-implemented method for collection of physical information and production of a three-dimensional visual replica of a fish, comprises:
    first providing a computer-implemented wireless mobile device having a processor, the wireless mobile device including a built-in camera system having a collector lens trained on a field of view;
    second providing a computer-implemented collection and production platform application configured for operation in relation to the processor to receive and record collected visual image data of the field of view;
    training the collector lens on a physical visual reference in the field of view;
    collecting visual image data of the field of view of the collector lens of the built-in camera responsive to receiving an actuation instruction;
    identifying specimen visual image data within overall visual image data for the complete field of view;
    compensating for uncontrolled floating motion of the vessel; and
    generating a virtual three-dimensional visual model of the fish, from the specimen visual image data provided from said identifying.

2. A no-kill computer-implemented method of claim 1 further comprises the step of:
    fabricating, by a three-dimensional printer, a physical three-dimensional visual replica from the generated virtual three-dimensional visual model of the fish.

3. A no-kill computer-implemented system for collection of physical information and production of a three-dimensional visual replica of a fish, comprises:
    a computer-implemented wireless mobile device having a processor and built-in camera having a lens trained on a field of view to collect visual image data of the field of view;
    a physical visual reference positioned in the field of view;
    a computer-implemented collection and production platform application configured for operation in relation to the processor of the wireless mobile device to receive visual image data for the field of view, further configured for recording the collected visual image data of the field of view;

an image identification system configured to identify specimen visual image data within overall visual image data for the complete field of view;

a platform motion compensation system configured for compensating for motion of a floating vessel supporting said no-kill computer-implemented system; and a model generation system configured for generating a virtual three-dimensional visual model from the specimen visual image data.

4. A no-kill computer-implemented system of claim 3 further comprising:

a three-dimensional replica fabrication system configured to fabricate a physical three-dimensional visual replica from the virtual three-dimensional visual model.

* * * * *